(12) United States Patent
Alnås et al.

(10) Patent No.: US 11,575,617 B2
(45) Date of Patent: Feb. 7, 2023

(54) MANAGEMENT OF SERVICES IN AN EDGE COMPUTING SYSTEM

(71) Applicant: SONY CORPORATION, Tokyo (JP)

(72) Inventors: Svante Alnås, Lund (SE); Linh Trang, Åkarp (SE)

(73) Assignee: Sony Group Corporation, Tokyo (JP)

( * ) Notice: Subject to any disclaimer, the term of this patent is extended or adjusted under 35 U.S.C. 154(b) by 13 days.

(21) Appl. No.: 16/783,991

(22) Filed: Feb. 6, 2020

(65) Prior Publication Data
US 2020/0304422 A1   Sep. 24, 2020

(30) Foreign Application Priority Data
Mar. 18, 2019  (SE) .................... 1950329-1

(51) Int. Cl.
| | | |
|---|---|---|
| G06F 15/173 | (2006.01) | |
| H04L 47/70 | (2022.01) | |
| H04L 43/0805 | (2022.01) | |
| H04L 47/20 | (2022.01) | |
| H04L 67/10 | (2022.01) | |
| H04L 67/141 | (2022.01) | |

(52) U.S. Cl.
CPC .......... *H04L 47/82* (2013.01); *H04L 43/0805* (2013.01); *H04L 47/20* (2013.01); *H04L 67/10* (2013.01); *H04L 67/141* (2013.01)

(58) Field of Classification Search
CPC ..... H04L 67/16; H04L 47/20; H04L 43/0805; H04L 67/10
USPC ................. 709/226, 220, 223, 224
See application file for complete search history.

(56) References Cited

U.S. PATENT DOCUMENTS

| | | | |
|---|---|---|---|
| 2005/0273668 A1* | 12/2005 | Manning ................. | H04L 12/66 714/39 |
| 2011/0238963 A1* | 9/2011 | Kim ...................... | G06F 9/3889 712/E9.035 |
| 2018/0063740 A1 | 3/2018 | McCormick et al. | |
| 2018/0183860 A1 | 6/2018 | Majumdar | |
| 2018/0332485 A1 | 11/2018 | Senarath | |
| 2020/0244722 A1* | 7/2020 | Jeuk ........................ | H04L 43/08 |
| 2020/0366732 A1* | 11/2020 | Trang .................... | H04W 48/20 |

(Continued)

FOREIGN PATENT DOCUMENTS

| | | |
|---|---|---|
| EP | 2921955 A1 | 9/2015 |
| WO | 2007113164 A1 | 10/2007 |

OTHER PUBLICATIONS

European Search Report for corresponding European Application No. 20155435.9, dated Jul. 10, 2020, 10 pages.

(Continued)

*Primary Examiner* — Lan Dai T Truong
(74) *Attorney, Agent, or Firm* — Tucker Ellis LLP (57) ABSTRACT

A method for managing services in an Edge Computing (EC) system that includes at least a first EC host and an EC management entity configured to control the first EC host to instantiate EC applications using one or more services. The method includes the EC management entity: obtaining service information associated with at least a first service for use by an EC platform or an EC application in an EC host; storing the service information in a central service registry of the EC system; and storing availability information associated with said first service in the central service registry.

20 Claims, 4 Drawing Sheets

(56) References Cited

U.S. PATENT DOCUMENTS

2021/0126986 A1* 4/2021 Rolf .................. H04L 67/52
2021/0144057 A1* 5/2021 Giust ................ H04L 63/0869

OTHER PUBLICATIONS

Swedish Search Report and Office Action from corresponding Swedish Patent Application No. 1950329-1, dated Sep. 30, 2019, 8 pages.

* cited by examiner

MANAGEMENT OF SERVICES IN AN EDGE COMPUTING SYSTEM

RELATED APPLICATION DATA

This application claims the benefit of Swedish Patent Application No. SE 1950329-1, filed Mar. 18, 2019, the disclosure of which is incorporated herein by reference in its entirety.

TECHNICAL FIELD

The invention and its embodiments are related to the field of systems for providing Edge Computing (EC) resources in connection with communication networks, whereby computing power is made available to user equipment operating in communication with the communication network. More specifically, the invention relates to devices and methods for management of services in an edge computing system.

BACKGROUND

The development of cloud-based services, operating to assist mobile devices with network-assisted storage and computing, is heavily increasing. Currently, ETSI (European Telecommunication Standards Institute) is promoting a new technology originally denoted Mobile Edge Computing (MEC), which is being standardized in an ETSI Industry Specification Group (ISG) of the same name. In the second phase of ETSI MEC ISG this is replaced by the term Multi-access Edge Computing, using the same acronym MEC, which also includes other types of access besides cellular, e.g. Wi-Fi and fixed networks.

MEC is a network architecture concept that enables cloud computing capabilities and an IT service environment at the edge of a communication network. MEC is the term used by ETSI for the concept mobile Edge Computing (EC). MEC allows applications to benefit from ultra-low latency and high bandwidth as well as real-time access to radio network information.

In the ETSI MEC specifications, e.g. ETSI GS MEC 002 and ETSI GS MEC003, a service registry is mentioned as a way for EC applications to find available EC services that the EC application could use. These EC services may be produced by the EC platform or by another EC application. For this purpose, an EC platform may make its local EC service discoverable in a local service registry of the EC platform.

However, an EC system may include several EC platforms, for each one EC host. There is thus a need for a technical solution for management of services in an EC system, that provides for convenient sharing and reuse of services.

SUMMARY

Solutions related to the problems associated with management of services in an EC system are set out in the claims.

In accordance with a first aspect, a method is provided for managing services in an Edge Computing, EC, system, comprising at least a first EC host and an EC management entity configured to control said first EC host to instantiate EC applications using one or more services, said EC management entity obtaining service information associated with at least a first service for use by an EC platform or an EC application in an EC host;

storing the service information in a central service registry of the EC system; and storing availability information associated with said first service in the central service registry.

By this method, a convenient solution for obtaining access to services for EC applications is provided, which may be used by local EC platforms and potentially even other EC systems.

In one embodiment, obtaining includes
receiving service information from a first EC platform of the first EC host, in which said first service is locally available to the first EC host.

In one embodiment, said availability information includes address information identifying one or more EC platforms in which said first service is locally available.

In one embodiment, the central service registry has an interface to a further EC management entity of a further EC system, for providing the further EC system access to the central service registry.

In one embodiment, the central service registry has an interface to a local service registry in at least the first EC, for providing access to the central service registry.

In one embodiment, the method comprises
mirroring information in the central service registry with a local service registry in at least the first EC host.

In one embodiment, the method comprises
storing policy information associated with the first service in the central service registry, identifying usage rights associated with said first service.

In one embodiment, said policy information defines a rule of right to use said first service in relation to an EC application provider.

In one embodiment, the method comprises
transmitting a service availability update message to the further EC system.

In one embodiment, the method comprises
receiving a service availability update message from the further EC system, associated with a second service;
updating the central service registry with service information associated with the second service.

In accordance with a second aspect, an Edge Computing, EC, management entity of an EC system is provided, which system includes at least a first EC host, the EC management entity comprising control circuitry configured to control said first EC host to instantiate EC applications using one or more services, said control circuitry being configured to obtain service information associated with at least a first service for use by an EC platform or an EC application in an EC host;

store the service information in a central service registry of the EC system; and store availability information associated with said first service in the central service registry.

In one embodiment, the control circuitry is configured to carry out the aforementioned method steps.

BRIEF DESCRIPTION OF THE DRAWINGS

Various embodiments will be outlined below with reference to the drawings, in which.

DESCRIPTION OF EMBODIMENTS

In the following description, for purposes of explanation and not limitation, details are set forth herein related to various embodiments. However, it will be apparent to those skilled in the art that the present invention may be practiced in other embodiments that depart from these specific details. In some instances, detailed descriptions of well-known devices, circuits, and methods are omitted so as not to obscure the description of the present invention with unnecessary detail. The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented and are thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Edge Computing (EC) is thought of as a natural development in the evolution of mobile radio stations and the convergence of IT and telecommunication networking. EC is based on a virtualized platform and will enable applications and services to be hosted 'on top' of mobile network elements, i.e. above the network layer. These applications and services can benefit from being in close proximity to the customer and from receiving local radio-network contextual information. The environment of EC is characterized by low latency, proximity, high bandwidth, and real-time insight into radio network information and location awareness, accomplished with EC servers hosting operator or 3rd party applications. As such, EC may enable new vertical business segments and services for consumers and enterprise customers. Frequently discussed use cases include video analytics, location services, Internet-of-Things (IoT), augmented reality, optimized local content distribution, data caching, mobile gaming, connected and controlled vehicle services etc. EC will allow software applications to tap into local content and real-time information about local-access network conditions. By deploying various services and caching content at the network edge, mobile core networks are alleviated of further congestion and can efficiently serve local purposes.

MEC is the term used by ETSI, but other forms of Edge Computing architectures are plausible, such as proprietary systems. For these reasons, the more general term Edge Computing (EC) will predominantly be employed herein, while the term MEC will occasionally be used to illustrate such examples.

Figure 1:
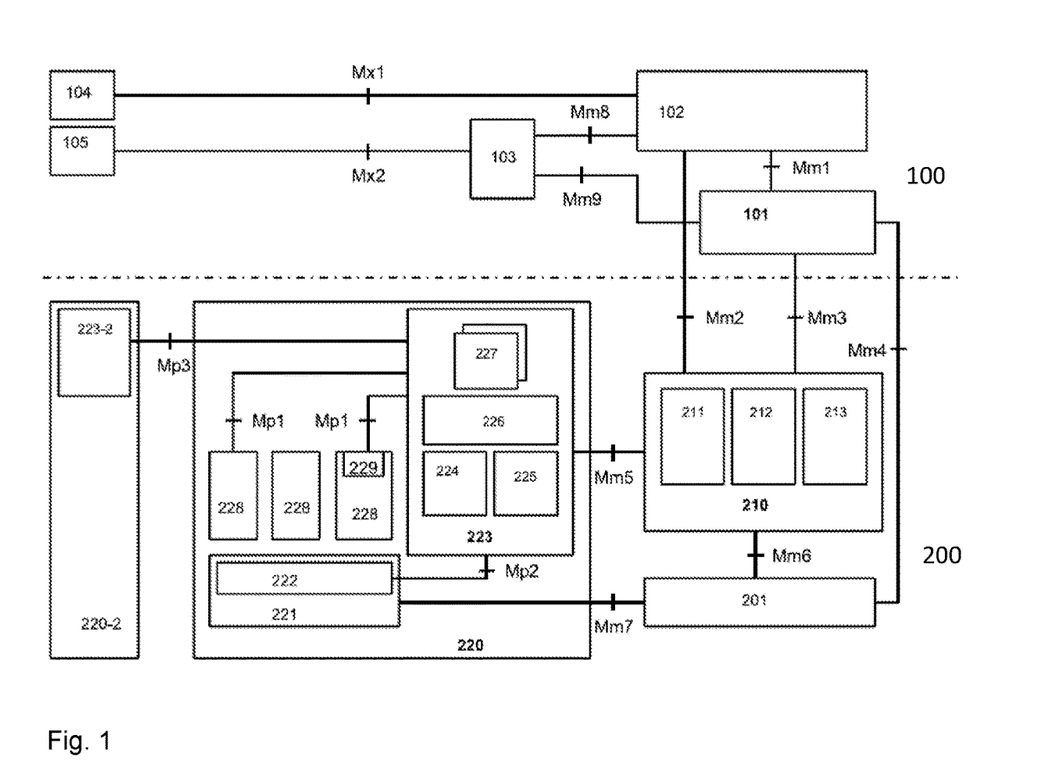
FIG. 1 illustrates an EC system according to one embodiment.

FIG. 1 illustrates an EC system reference architecture, in the form of a MEC network architecture configured according to an embodiment, showing functional elements that comprise the EC system, and the reference points between them.

In a broad context, an EC system comprises one or more EC hosts or servers, which hosts may run or execute EC applications to users, connecting to the EC system through a User Equipment (UE), typically by radio communication. Moreover, the EC system comprises an EC management entity, which is configured to control the EC hosts to instantiate EC applications using one or more services.

For an ETSI MEC system with MEC components, as shown in FIG. 1, there are three groups of reference points defined between the system entities:

reference points regarding MEC platform functionality (Mp);

management reference points (Mm); and reference points connecting to external entities (Mx).

In accordance with some embodiments, an MEC system may be divided into an MEC system level 100 and an MEC host level 200. The system may comprise one or more MEC hosts 220, 220-2 etc., and MEC management necessary to run MEC applications within an operator network or a subset of an operator network.

The MEC host 220 may be an entity that contains an MEC platform 223 and a virtualization infrastructure 221 which provides compute, storage, and network resources, for the purpose of running MEC applications 228.

The MEC host 220, 220-2, or more generally an EC server or EC host 220, may comprise an MEC platform 223, which is a collection of essential functionality required to run MEC applications 228, more generally referred to herein as EC applications, on a particular virtualization infrastructure and enable them to provide and consume MEC services. The MEC platform 223 may also provide services. Such services may e.g. include radio network information services, configured to provide authorized EC applications with radio network related information; location services, configured to provide authorized EC applications with location-related information; bandwidth manager services, configured to allow allocation of bandwidth to certain traffic routed to and from EC applications and the prioritization of certain traffic.

EC applications 228 are instantiated on the virtualization infrastructure of the MEC server 220 based on configuration or requests validated by MEC management. The MEC management may comprise MEC system level management and MEC host level management. Further MEC servers 220-2 may form additional EC servers of the system, which may be configured in a corresponding manner as the MEC server 220.

The MEC system level management includes an MEC orchestrator 101 as a core component, which is configured to have an overview of the complete MEC system, and an operations support system 102. The MEC host level management comprises an MEC platform manager 210 and a virtualization infrastructure manager 201 and is configured to handle management of MEC specific functionality of a particular MEC host 220, and the applications 228 running on it.

In an embodiment configured in accordance with the ETSI MEC standard, the system may comprise the following elements or features:
- 100 Mobile edge system level
- 101 Mobile edge orchestrator
- 102 Operations Support System
- 103 User app LCM proxy
- 104 CFS portal
- 105 UE app
- 200 Mobile edge host level
- 201 Virtualization infrastructure manager
- 210 Mobile edge platform manager
- 211 MEC platform element mgmt
- 212 MEC app rules & reqts mgmt
- 213 MEC app lifecycle mgmt
- 220 Mobile edge server
- 221 Virtualization infrastructure
- 222 Data plane
- 223 Mobile edge platform
- 224 Traffic rules control
- 225 DNS handling
- 226 Service registry
- 227 MEC service
- 228 MEC app
- 229 Service
- 220-2 Other MEC server
- 223-2 Other MEC platform In the context of the solutions provided herein, an embodiment set out for MEC may include an EC management entity 300 which includes at least the orchestrator 101, but the EC management entity may also include the Operations Support System 102.

Figure 2:
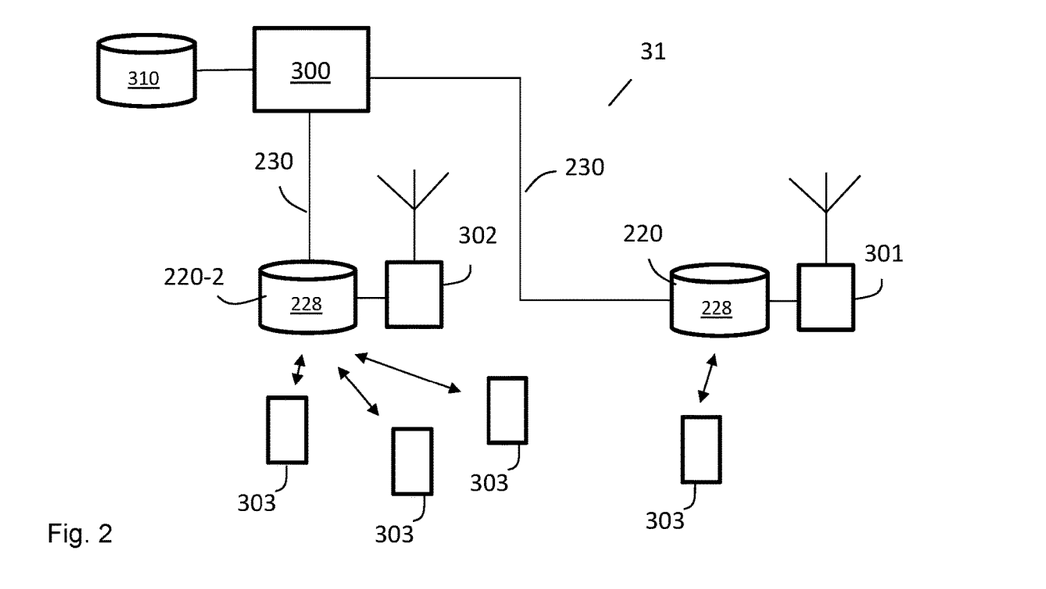
FIG. 2 illustrates a scenario of mobile devices supported by an EC system according to an embodiment.

FIG. 2 schematically illustrates various User Equipment (UE) 303 operating as wireless devices 303 in a wireless communication network comprising network nodes 301, 302. The wireless communication network may comprise a radio access network, and the network nodes 301, 302 may be radio stations in a cellular arrangement. Such a radio communication network may e.g. be a 3GPP LTE network, in which the network nodes 301, 302 are denoted eNodeB. Furthermore, in a 3GPP NR network, the network node 301, 302 are denoted gNodeB. In an alternative embodiment, the radio communication network may e.g. be a Wi-Fi system, such as according to IEEE 802.11. The network nodes 301, 302 may in such a system be denoted access points and are typically not arranged in a cellular arrangement. In various embodiments, various EC servers may be configured to be connectable to UEs using other communication technologies, such as e.g. Bluetooth, LoRa, ZigBee etc. It may also be noted that different EC servers, or hosts, 220, 220-2 may be connected to different types of access network nodes 301, 302, while still belonging to a common EC system.

A first server 220 configured to operate as an EC server or host is connected to a first radio station 301, and a second server 220-2 configured to operate as an EC server or host is connected to a second radio station 302. An EC management entity 300 may be configured to control relocation of an application session from the first EC server 220 to the second EC server 220-2. As noted, and with reference to FIG. 1, the EC management entity 300 may e.g. comprise an MEC orchestrator 101 and an operations support system 102, and optionally also an MEC platform manager 210 in various embodiments. An interface 230 is schematically indicated between an EC application 228 and the EC management entity 300. This interface may be employed for providing application context obtained in the EC server 220, to the management entity 300, which inter alia may be configured to control relocation of an application session from the first EC server 220 to a second EC server 220-2.

EC services are held available in EC platforms of the EC hosts, 220, 220-2. For this purpose, a local service registry 226 may me held in the EC platform. However, there is no defined means for sharing availability of services in the EC system. In the state of the art solution, an EC management entity 300 will have to access the local service registry 226 using an interface Mm3 so as to obtain knowledge of which services are provided, e.g. for the purpose of sharing availability to other EC hosts.

In the embodiments proposed herein, a centralized service registry (CSR) 310 is provided, which may be connected to and under the control of the EC management entity 300. In these embodiments, the management entity 300 of an EC system is responsible for the exchange of information regarding the CSR 310 and its updates within the EC system. In addition, the EC management entity may be responsible for the exchange of information regarding the CSR 310 and its updates between different EC systems. This configuration of the EC system is schematically outlined in FIGS. 3 and 4. Note that in these figures the EC host 220 etc. is not shown, but rather the EC platform 223. However, it will be understood by the skilled reader that such an EC platform 223 is comprised in or in connection with an EC host 220.

Figure 3:
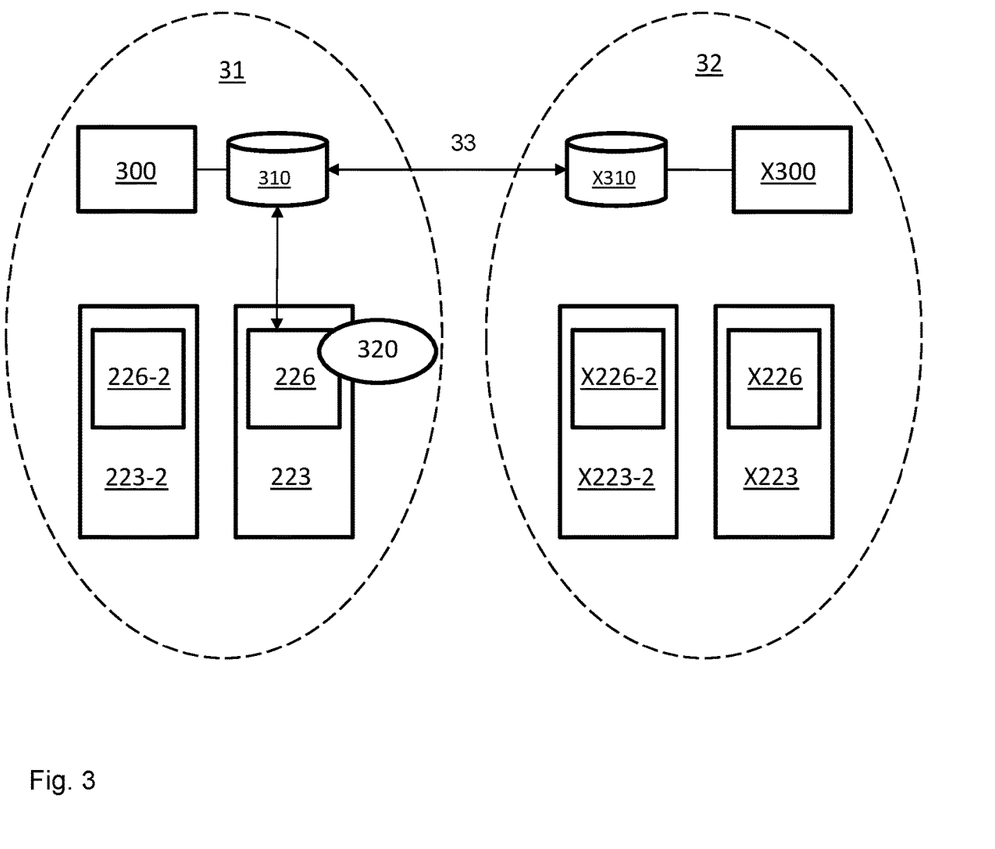
FIG. 3 schematically illustrates an EC system having a central service registry, accessible to a local service registry and potentially also to a second EC system.

FIG. 3 illustrates a first EC system 31, comprising an EC management entity 300 and at least a first EC host 220 and potentially further EC hosts 220-2 with respective EC platforms 223, 223-2. The EC management entity 300 is configured to control the EC host(s) 220, 220-2 within the EC system 31 to instantiate EC applications using one or more services, provided and consumed either by the EC platform 223 or an EC application 228 of the host 220. The EC host 220 implements a local service registry 226, which identifies at least a first service 320.

The EC management entity 300 is configured to obtain service information associated with at least the first service 320, which service is devised for use by an EC platform 223 or an EC application 228 in an EC host 220. In the embodiment of FIG. 3, this obtainment may be carried out by retrieving information from the local service registry 226 of an EC platform 223. The service information may be specific identification information related to a specific service 320, or e.g. a complete mirroring of identification information in the local service registry 226. In yet another embodiment, the service information may be a link or address to such identification information in the local service registry 226.

The EC management entity 300 is configured to store the service information in the CSR 310 of the EC system 31. The CSR 310 may e.g. be stored in or coupled to an EC platform manager 210, or otherwise communicatively connected to the EC management entity 300. The EC management entity 300 may further be configured to store availability information associated with said first 320 service in the CSR 310. Said availability information may include address information identifying one or more EC platforms in which said first service 320 is locally available.

The EC management entity 300 is further configured to provide an interface 33 to a further EC management entity x300 of a further EC system 32, for providing the further EC system 32 with access to the CSR 310. The second EC system 32 further comprises and at least one EC host x220 and potentially further EC hosts x220-2 (not shown), each comprising an EC platform x223, x223. The EC management entity x300 is configured to control the EC host(s) x220, x220-2 within the EC system 32 to instantiate EC applications using one or more services, provided and consumed either by the EC platform x223 or an EC application 228 of the host x220. The EC host x220 further implements a local service registry x226, identifying available services.

Figure 4:
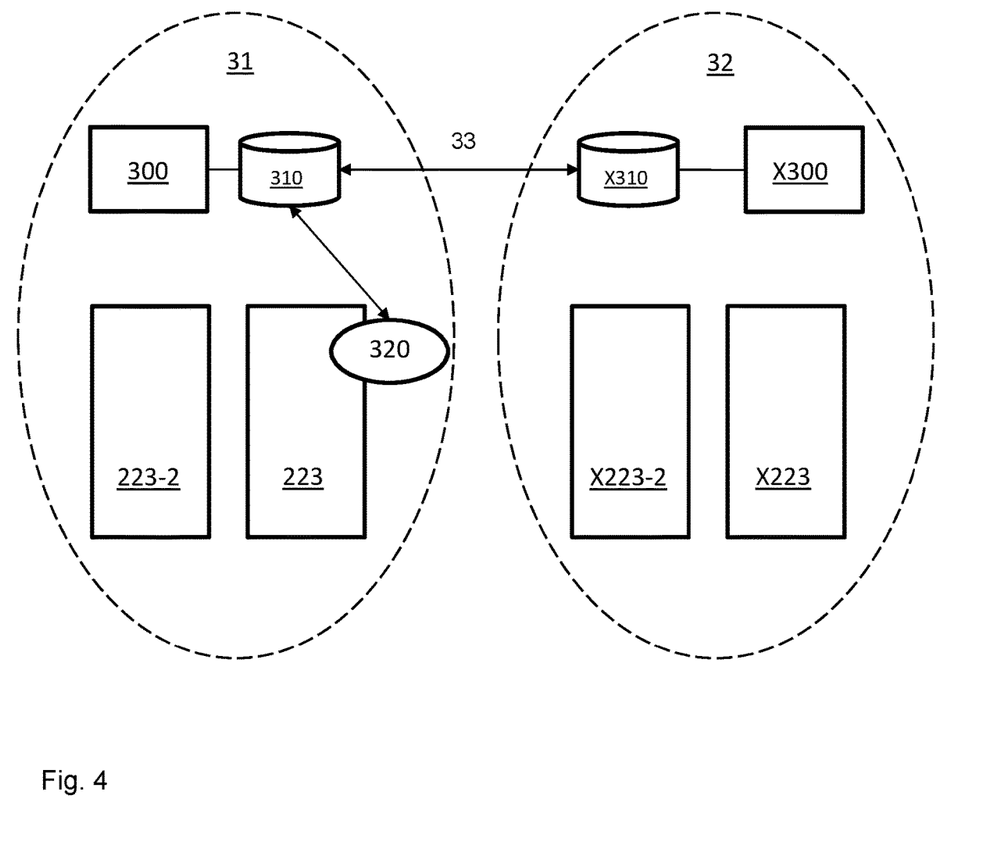
FIG. 4 schematically illustrates an EC system having a central service registry, accessible to a local EC platform and potentially also to a second EC system.

FIG. 4 illustrates an EC system configuration which is a variant of the embodiment of FIG. 3, comprising an EC management entity 300 and at least a first EC host 220 and potentially further EC hosts 220-2. The EC management entity 300 is configured to control the EC host(s) 220, 220-2 within the EC system 31 to instantiate EC applications 228 using one or more services, provided and consumed either by the EC platform 223 or an EC application 228 of the host 220. The EC host 220 implements a local service registry 226, which identifies at least a first service 320.

The EC management entity 300 is configured to obtain service information associated with at least the first service 320, which service is devised for use by an EC platform or an EC application in an EC host. In the embodiment of FIG. 4, this obtainment may be carried out by retrieving information from an EC platform 223 of a service used or stored in the EC platform 223. In this embodiment, the CSR 310 is configured to replace, or be used instead of, a local service registry in the EC platform 223. The service information may be specific identification information related to a specific service 320. In another embodiment, the service information may be a link or address to where such identification information is stored.

The EC management entity 300 is configured to store the service information in the CSR 310 of the EC system 31. The CSR 310 may e.g. be stored in or coupled to an EC platform manager 210, or otherwise communicatively connected to the EC management entity 300. The EC management entity 300 may further be configured to store availability information associated with said first 320 service in the CSR 310. Said availability information may include address information identifying one or more EC platforms in which said first service 320 is locally available.

The EC management entity 300 is further configured to provide an interface 33 for the CSR 310. In various embodiments, the interface 33 to the CSR 310 may be used by other EC systems, such as a further EC system 32, or by any other local service registry 226. Local service registry may contain services that are published by local MEC services. In addition, the local service registry may mirror other services from the CSR that is accessible by local MEC applications. The CSR may contain a mirror of all available services from all local service registries. An API to the CSR may be used by local service registry or other MEC systems, such as a further EC system 32 having a further EC management entity x300, for providing the further EC system 32 with access to the CSR 310.

In various embodiments as described with reference to FIGS. 3 and 4, the CSR 310 contains available local EC services that are available within the local EC system 31, and which ones of those that are exposed to external EC systems 32. In various embodiments, the CSR 310 further comprises information about all available EC services outside the local EC system 31 that are available for the local EC applications in the system 31. The CSR may be mirrored by the local EC service registries in the EC platforms as in FIG. 3, or be employed instead of local registries 226, 226-2 as in FIG. 4. The CSR 310 may contain information on which EC platform 223, such as a Mobile Edge Platform, that host these EC services.

In various embodiments, the CSR may be configured to store policy information associated with services, such as the first service 320. Such policy information may comprise usage rights associated with the services. The policy information may thus define a rule of right to use a service, such as the first service 320, in relation to an EC application provider, such as an application provider, owner, or creator. An example of such a policy may be that an EC service 320 produced in one EC operator system or network 31 is allowed to be shared and consumed in another EC operator system or network 32, but restricted to use with applications provided by the operator of the first EC system 31, and e.g. not for any 3rd party applications running in the second EC system 32.

In various embodiments, an interface 33 is configured between the management entities 300, x300 in different EC systems 31, 32, e.g. orchestrators of MEC systems 31, 32, which interface 33 is used for exchanging EC service availability information between EC systems. The interface 33 may be employed by the management entities 300, x300 of different EC systems 31, 32 to set up respective CSRs 310, x310 for exchange of availability information related to services. In FIGS. 3 and 4, the interface 33 is logically illustrated between the respective CSRs 310, 310x, but the proposed solutions, in which the first EC system has a CSR 310 does not require that the second EC system 32 has a corresponding CSR x310. In alternative embodiments, the management entity x300 of the second EC system 32 may be configured to obtain service availability information from the CSR 310 and use that information for instantiating applications in a host x220, and potentially updating a local service registry in that EC host x220.

For an embodiment realized under MEC, the Mm3 reference point between the multi-access edge orchestrator 101 and the MEC platform manager 210 may be used for the management of the application lifecycle, application rules and requirements and keeping track of available MEC services. In accordance with the solutions presented herein, the orchestrator 101, 300 is configured to keep track of available MEC services using a centralized service registry 310, providing for a more efficient solution than arranging for synchronization among all local service registries. This allows all local service registries, where present, to receive available remote services from the central service registry. Furthermore, having information on available MEC services on system level also facilitates the exchange of MEC service information between MEC systems. In accordance with a general solution, which may be realized in accordance with any of the embodiments outlined herein, a method may be carried out between two EC management entities 300 and x300, such as MEC Orchestrators, belonging to different EC systems 31 and 32. This method may involve:

1. An EC service 320 becomes available in EC system 31. Information about this availability may be obtained in the EC management entity 300 of the first EC system from a host 220, such as a platform manager 223 in that host 220. Alternatively, obtainment of that availability may be provided through an EC application 228 making use of the service 320.

2. The EC management entity 300 sends an EC service availability update to the EC management entity x300 in a second EC system 32. This step is preferably carried out through an interface 33 between the two EC systems 31, 32.

3. The EC management entity x300 updates its CSR x310, e.g. location of the EC service 320, policy for use of the service 320 by application etc., as exemplified.

4. Optionally, the EC management entity x300 updates local service registries x226 in the EC platforms x223, such as MEPs, of one or more hosts x220 of the second EC system 32.

Figure 5:
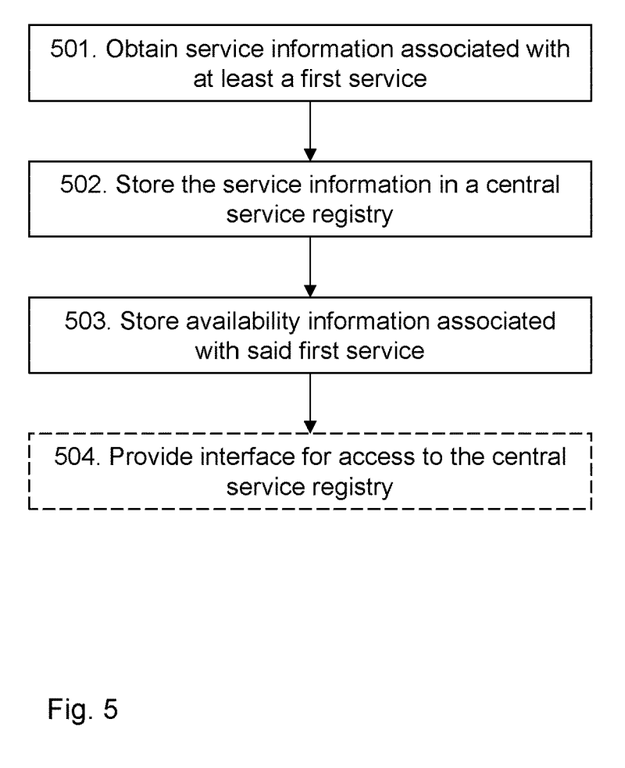
FIG. 5 schematically illustrates a flow chart for a method for management of services in an edge computing system according to an embodiment.

FIG. 5 schematically illustrates a general method in accordance with the suggested solution. This relates to a method for managing services in an Edge Computing, EC, system 31, comprising at least a first EC host 220 and an EC management entity 300 configured to control said first EC host to instantiate EC applications using one or more services. The EC system 31 and its components may be configured in accordance with a Mobile Edge Computing system as specified by ETSI, and may be configured to assist UEs 303 with running application tasks using one or more services. The EC management entity 300 may carry out the steps of

501: Obtaining service information associated with at least a first service 320 for use by an EC platform 223 or an EC application 228 in an EC host. As noted, the service information may be associated with a specific service 320, which has become available, e.g. in a host 220 of the EC system 31. In alternative embodiments, the service information may comprise all services available for use in a host 220 for execution of EC applications 228. The obtainment may e.g. be triggered by new availability of a service 320, an update of a local service registry 226 in a host 220, by an application 228 first making use of a service 320 when instantiated or executed in a host 220, or by a request from another entity, such as another EC management entity x300 of a different EC system 32.

502: Storing the service information in a central service registry CSR 310 of the EC system 31. The CSR may form part of the EC management entity 300, or be connected thereto. The service information may include at least a name or identity of the service 320, and possibly a subject or task associated with that service 320, such as e.g. location determination, communication services, video analytics etc.

503: Storing availability information associated with said first service 320 in the CSR 310. Availability information may e.g. include location of storage of the service 320, such as a host 220 or platform 223, or other data execution environment at which the service 320 may be stored or executed. This step may further include storing policy information associated with a service 320 in the CSR 310, identifying usage rights associated with the service.

504. An optional step of providing an interface 33 for access to the central service registry. An API for this interface may be used by local registries in the EC host 220, or in other hosts. Moreover, the same interface may be used by a further EC management entity x300 of a further EC system 32, for providing the further EC system 32 access to the central service registry CSR 300.

Figure 6:
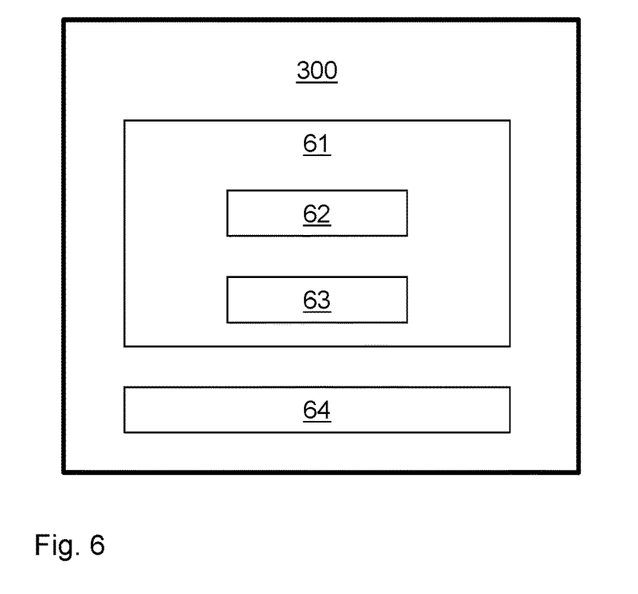
FIG. 6 schematically illustrates an embodiment of an EC management entity configured to carry out the procedures outlined herein.

FIG. 6 schematically illustrates an embodiment of an EC management entity 300 of an EC system 31. The EC management entity 300 comprises control circuitry 61 being configured to carry out the method steps of any of the embodiments outlined herein. The control circuitry 61 may comprise one or more processors 62, and memory storage 63 for storing computer code, such as a non-volatile memory, which code the processor 62 is configured to execute to carry out the methods presented herein. The management entity 300 may further comprise at least one interface 64, for communicative control signaling with at least one host 220 of the EC system. The EC management entity is thereby configured to control said EC host to instantiate EC applications using one or more services, wherein the control circuitry 61 being configured to obtain service information associated with at least a first service for use by an EC platform or an EC application in an EC host;

store the service information in a central service registry of the EC system; and store availability information associated with said first service in the central service registry.

This method, and the EC management entity configured to carry out the method, allows for convenient management of services, which may be advantageously used for running EC applications. Rather than having to poll or query for available services in one or several local service registries, appropriate designation and use of EC services may be determined. Designation of a service to use for a certain application may be determined by the EC management entity 300 of EC system 31, e.g. upon the instantiation of such an application in an EC host 220 or platform 223, or correspondingly by a service management entity x300 of the further EC system 32. Alternatively, the EC host 220 or platform 223 may address the CSR 310 for determining which service to use for executing an application. In various embodiments, a local registry 226 may be included in one or more EC platforms 223, which may mirror the CSR 310, for convenient designation of services 320 upon execution or instantiation of an application 228. Mirroring of local registries, i.e. ensuring that service information available in the CSR 310 is copied into a local registry 226, may e.g. be triggered by the CSR 310 being updated, or periodically according to a determined schedule. Mirroring uplink, from a local registry 226 to the CSR 310, is preferably triggered by any local update of the local registry 226.

Various embodiments have been disclosed in the foregoing, related to the proposed concept of management of mobile edge computing servers. Unless clearly contradictory, such embodiments may be combined in any way.

We claim:

1. A method for managing services in an Edge Computing (EC) system, comprising at least a first EC host and an EC management entity configured to control said first EC host to instantiate EC applications using one or more services, said EC management entity performing the steps of:

obtaining service information associated with at least a first service for use by an EC platform in an EC host or an EC application in the EC host;

storing the service information in a central service registry managed by the EC management entity of the EC system; and storing availability information associated with said first service in the central service registry.

2. The method of claim 1, wherein obtaining includes receiving service information from a first EC platform of the first EC host, in which said first service is locally available to the first EC host.

3. The method of claim 1, wherein said availability information includes address information identifying one or more EC platforms in which said first service is locally available.

4. The method of claim 1, wherein the central service registry is provided with an interface to a further EC management entity of a further EC system, for providing the further EC system access to the central service registry.

5. The method of claim 4, comprising
transmitting a service availability update message to the further EC system.

6. The method of claim 4, comprising
receiving a service availability update message from the further EC system, associated with a second service;
updating the central service registry with service information associated with the second service.

7. The method of claim 1, wherein the central service registry is provided with an interface to a local service registry in at least the first EC host, for providing access to the central service registry.

8. The method of claim 7, comprising
mirroring information in the central service registry with a local service registry in at least the first EC host.

9. The method of claim 1, comprising
storing policy information associated with the first service in the central service registry, identifying usage rights associated with said first service.

10. The method of claim 9, wherein said policy information defines a rule of right to use said first service in relation to an EC application provider.

11. An Edge Computing (EC) management entity of an EC system, which system includes at least a first EC host, the EC management entity comprising control circuitry configured to control said first EC host to instantiate EC applications using one or more services, said control circuitry of the EC management entity being configured to:
obtain service information associated with at least a first service for use by an EC platform in an EC host or an EC application in the EC host;
store the service information in a central service registry managed by the EC management entity of the EC system; and
store availability information associated with said first service in the central service registry.

12. The EC management entity of claim 11, wherein the control circuitry is configured to
receive service information from a first EC platform of the first EC host, in which said first service is locally available to the first EC host.

13. The EC management entity of claim 11, wherein said availability information includes address information identifying one or more EC platforms in which said first service is locally available.

14. The EC management entity of claim 11, wherein the central service registry is provided with an interface to a further EC management entity of a further EC system, for providing the further EC system access to the central service registry.

15. The EC management entity of claim 14, wherein the control circuitry is configured to
transmit a service availability update message to the further EC system.

16. The EC management entity of claim 14, wherein the control circuitry is configured to
receive a service availability update message from the further EC system, associated with a second service;
update the central service registry with service information associated with the second service.

17. The EC management entity of claim 11, wherein the central service registry is provided with an interface to a local service registry in at least the first EC host, for providing access to the central service registry.

18. The EC management entity of claim 17, wherein the control circuitry is configured to
mirror information in the central service registry with a local service registry in at least the first EC host.

19. The EC management entity of claim 11, wherein the control circuitry is configured to
store policy information associated with the first service in the central service registry, identifying usage rights associated with said first service.

20. The EC management entity of claim 19, wherein said policy information defines a rule of right to use said first service in relation to an EC application provider.

* * * * *